3,277,053
FLAME AND HEAT RESISTANT POLYMERIC MATERIALS CONTAINING 2-(BROMOPHENOXY OR CHLOROPHENOXY)ETHYL AND/OR PROPYL ACRYLATES AND/OR METHACRYLATES
Edward H. Hill, John R. Caldwell, and Winston J. Jackson, Jr., all of Kingsport, Tenn., assignors to Eastman Kodak Company, Rochester, N.Y., a corporation of New Jersey
No Drawing. Filed June 7, 1965, Ser. No. 462,133
4 Claims. (Cl. 260—47)

This application is a continuation-in-part of a copending U.S. application Serial No. 211,844, filed July 23, 1962, now abandoned.

The present invention relates to copolymeric materials containing 2-bromophenoxy ethyl or propyl acrylates or methacrylates and mixtures thereof. These materials exhibit such properties as improved inherent resistance to flaming and glowing, improved resistance to hydrolysis, high hot-bar sticking temperatures and improved thermal stability.

Heretofore, the application of flame retarding coatings or precipitates to natural fibers and synthetic polymeric materials has been the most exploited approach to the flammability problem. However, many additional problems arise from these techniques, such as fabric deterioration and adverse effects on the color, strength, air permeability, moisture permeability and other properties of the fabric.

Another approach has been the incorporation of halogen atoms into the polymer molecule. During thermal degradation of the polymer, these halogen atoms combine with hydrogen atoms to form flame extinguishing hydrogen chloride. Such self-extinguishing polymers, and particularly the copolymers, tend to exhibit relatively low softening or melting points which render them unsuitable for the manufacture of clothing and the like which must be ironed or otherwise subjected to heat. Moreover, these polymers and copolymers are often easily hydrolyzable.

A principal object, therefore, of the invention is to provide polymeric materials from which clothing and other articles may be readily produced and which are characterized by improved resistance to burning, relatively high softening points and improved resistance to hydrolysis.

Another object is to provide, according to the above object, a large number of non-flammable polymeric materials differing in their physical characteristics and adaptable to a great variety of uses.

Another object is to provide copolymers according to the above objects from which surface coating materials, films, fibers, sheets, rods, and the like may be produced by present manufacturing techniques and apparatus.

In accordance with the present invention, the above objects are achieved by copolymerizing bromophenoxy ethyl or propyl acrylates or methacrylates with certain other types of unsaturated compounds either in organic solvent or water systems. The resulting copolymeric products exhibit significantly improved non-flamming characteristics, unusually high softening points and improved resistance to hydrolysis. These products may be formed by the usual methods to give surface coating materials, films, fibers, sheets, rods or other desired shapes. For example, they can be dissolved in solvents and spun by wet or dry methods into fibers, or they can be molded by injection or compression methods to a variety of shapes. The molecular weights of the copolymers will, of course, vary over wide ranges depending on the degree of polymerization. Molecular weights of above 30,000, however, are preferable for fiber and film forming operations.

The copolymers of the present invention are prepared by polymerization of the aforesaid acrylates or methacrylates with a wide variety of unsaturated compounds, hereinafter termed comonomers, and having a —CH=C<, CH$_2$=C<, or —CH=CH—CH=CH— group. Exemplary of such comonomers are acrylic and methacrylic esters such as methyl acrylate, ethyl acrylate, methyl methacrylate, and butyl methacrylate; derivatives of olefinic dibasic acids including maleates, maleamides, maleamates, and maleimides; the esters, amides, and esteramides of fumaric, itaconic, and citraconic acids; vinyl esters, vinyl ethers and vinyl ketones; the vinyl derivatives of benzene as represented by styrene, α-methylstyrene, p-acetaminostyrene, p-methylstyrene, and α-acetoxystyrene; acrylonitrile and methacrylonitrile; halogen compounds including vinyl chloride, vinyl fluoride, vinylidene fluoride, tetrafluoroethylene, and chlorotrifluoroethylene; other types of useful monomers include ethylene, isobutylene, N-vinyl imides, N-vinyl lactams, and isopropenyl acetate; the amides, N-alkylamides, an N,N-dialkylamides of acrylic and methacrylic acids; butadiene, isoprene, 2,3-dimethylbutadiene, 2-chlorobutadiene, 2-cyanobutadiene, 2-phenylbutadiene, tetramethylbutadiene and 2-acetoxybutadiene. With such a variety of comonomers to choose from, it is apparent that a great variance in such properties as flexibility, extensibility and the like of the copolymers can be obtained.

To further illustrate the uniqueness of these new copolymers, applicants point out below the superior fiber properties of the representative copolymer of acrylonitrile and 2-(2,4,6-tribromophenoxy)ethyl acrylate as compared with copolymers of acrylonitrile and various acrylates and methacrylates containing about the same number of carbon atoms. The following table employs fibers of 70/30 copolymers of acrylonitrile and the various acrylates. The properties of polyacrylonitrile are also included. The hot-bar sticking points are determined by touching solid samples of each polymer with uniform force against a graduate temperature bar and determining at which temperature the polymer begins to adhere, by means of a uniformly applied pulling force.

| Acrylate | Tenacity, g./den. | Elongation, Percent | Hot-Bar Sticking Point, °C. | Flow Point at 0.2 g./dn °C.e |
|---|---|---|---|---|
| 2-(2,4,6-tribromo phenoxy) ethyl acrylate | 2.5 | 15 | 232–235 | 259 |
| Octyl acrylate | 1.9 | 19 | 90 | 140 |
| 2-ethylhexyl-acrylate | 2.2 | 22 | 178 | 152 |
| N-hexyl methacrylate | 2.7 | 15 | 118 | 152 |
| Polyacrylonitrile | 4.4 | 14 | 224–244 | 228 |

As a general rule, as comonomer content of acrylonitrile type polymers is increased the hot-bar sticking point and flow point progressively decrease. Thus it is most surprising to find that the present brominated comonomers do not cause any decrease in these properties even when large amounts are incorporated in the copolymer. Also, it is noted that the copolymer with tribromophenoxyethyl acrylate is also self-extinguishing while the others burn readily.

A further appreciation of the present invention can be obtained from the comparison given below of the effect of the present brominated esters versus their chlorinated counterparts on copolymers with acrylonitrile. It is particularly noted that the substantially higher hot-bar sticking points of the copolymers with the brominated ester are quite unexpected and are of considerable importance with respect to broader utility and greater leeway in processing temperatures.

| Composition | Tenacity, g./den. | Elongation, Percent | Hot-Bar Sticking Point, °C. | Flow Point at 0.2 g./den., °C. |
|---|---|---|---|---|
| 70 parts of AN, 30 parts of 2-(2,4,6-trichlorophenoxy)ethyl acrylate | 2.3 | 17 | 204–208 | 271 |
| 70 parts of AN, 30 parts of 2-(2,4,6-tribromophenoxy)ethyl acrylate | 2.5 | 15 | 232–235 | 259 |
| 80 parts of AN, 20 parts of 2-(2,4,6-trichlorophenoxy)ethyl acrylate | 2.9 | 14 | 220 | 232 |
| 80 parts of AN, 20 parts of 2-(2,4,6-tribromophenoxy)ethyl acrylate | 3.15 | 15 | 240–242 | 260 |

The methacrylate esters give copolymers having substantially the same properties as shown for the acrylate ester copolymers. The compositions containing the tribromo derivatives were also self-extinguishing while those containing the trichloro derivative burned readily. In this regard, it is particularly significant that at least about 31% chlorine is required in a polymer to make it self-extinguishing. Therefore, even if the pentachloro derivative were used in place of the trichloro, it would still mean that the polymer could contain only 30% acrylonitrile if it were to be self-extinguishing. At this level of acrylonitrile the physical properties of the yarn are very poor as illustrated below.

| Composition | Tenacity, g./den. | Elongation, Percent | Hot-Bar Sticking Point, °C. | Flow Point at 0.2 g./den., °C. |
|---|---|---|---|---|
| 30 parts of AN, 70 parts of 2-(2,3,4,5,6-pentachlorophenoxy)ethyl acrylate | 0.86 | 9 | 118–125 | 130 |

In this regard it is noted that exceptionally good non-flammability characteristics are obtained from a bromine atom content greater than about 15% by weight of the copolymer.

The copolymerizations are preferably and conveniently carried out in water containing dispersed monomer and suitable catalyst. Satisfactory catalysts include ammonium persulfate, sodium persulfate, hydrogen peroxide, sodium perborate and the like. Other suitable catalysts soluble in the organic phase include benzoyl peroxide, acetyl peroxide, tert-butylhydroperoxide, and azobisisobutyronitrile. Representative dispersing agents include sodium dodecyl sulfate, sodium octadecyl sulfate, sodium dodecylbenzene sulfonate, soaps and sulfonated mineral oils. Certain polymerizations may be more conveniently carried out in organic solvents such as the lower alcohols, ketones, or esters, aromatic or aliphatic hydrocarbons, dioxane, dimethylformamide, and the glycol monoethers. Mass or bulk polymerization may also be employed. The particular polymerization technique or system used will of course be dictated primarily by the form in which the copolymer is desired, that is, water suspension, bead, and so forth.

The copolymers may contain from about 10% to about 95% of the acrylate or methacrylate with the preferred range being from about 25% to about 70% depending on the degree of bromination of the monomer. Particularly desirable copolymers are those prepared from about 60–90% of acrylonitrile and conversely from about 40–10% of 2-(2,4,6-tribromophenoxy)ethyl acrylate, with the most desirable percentages being from about 65–75 and from about 35–25 respectively. All percentages stated herein shall be by weight unless otherwise specified. Should the comonomer be halogenated, the lower percentages of the phenoxyethyl acrylate or methacrylate may be used to obtain the flame resistant polymeric products.

The vinyl monomers are prepared according to the following reactions:

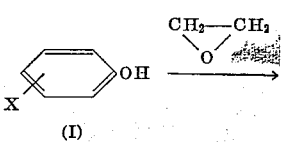

(I)

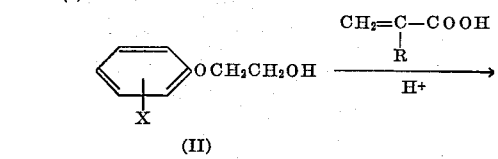

(II)

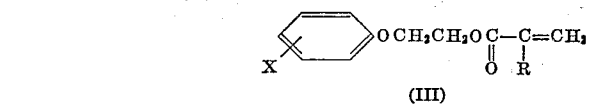

(III)

wherein X=1 to 5 bromine atoms, and R=hydrogen or methyl.

The first reaction is accomplished by heating the halogenated phenol with ethylene oxide in an inert solvent in an autoclave at 60–150° C. and preferably at about 100° C. The reaction is facilitated by the presence of an alkali metal hydroxide. In preparing the halophenoxypropanols, propylene oxide is used in place of the ethylene oxide. These alcohols may also be prepared by refluxing an aqueous or alcoholic solution of the phenol sodium salt and 2-bromoethanol or 3-bromopropanol respectively.

The acrylate or methacrylate ester is prepared by refluxing a mixture containing acrylic or methacrylic acid, the halogenated phenoxyethanol or halogenated phenoxypropanol, benzene, acidic catalyst such as sulfuric or toluenesulfonic acid, and polymerization inhibitors such as methylene blue, hydroquinone, cuprous chloride, and copper tinsel. The water which is formed in the reaction is removed in the benzene azeotrope and collected in a Dean-Stark trap. A slight excess of the acrylic or methacrylic acid is added to ensure completion of the reaction.

The specific examples which follow are intended to further illustrate the novel aspects of the invention and the means for practicing the same.

EXAMPLES OF MONOMER PREPARATION

*Example I*

2-(2,4,6-tribromophenoxy)ethanol was prepared as follows: To 100 g. of 2,4,6-tribromophenol and 5 g. of potassium hydroxide in an autoclave was added a solution containing 18 g. of ethylene oxide in 380 ml. of isopropanol. The reaction was then carried out at 100° C. for 3 hours. After the solution was concentrated on a steam bath, the residue was stirred with 10% aqueous sodium hydroxide to remove any unreacted tribromophenol. The product was then washed several times with water and dried. It melted at 108° C.

The acrylate was prepared by refluxing a mixture containing 58 g. of 2-(2,4,6-tribromophenoxy)ethanol, 15 g. of acrylic acid, 4 g. of p-toluenesulfonic acid, 0.2 g. of methylene blue, 0.1 g. of cuprous chloride, 0.8 g. of copper tinsel, and 100 ml. of benzene. The water was azeotropically removed and collected in a Dean-Stark trap. After about 8 hours, the theoretical amount had collected. The solution was filtered through a bed of Kleenflo to remove the methylene blue and treated with aqueous sodium bicarbonate to remove the catalyst and excess acrylic acid. The benzene was then removed by distillation at 30° C. under reduced pressure. The acrylate was a viscous oil which solidified somewhat below room temperature.

*Example II*

2 - (2,4,6-tribromophenoxy)ethyl methacrylate.—This ester was prepared from the tribromophenoxyethanol of Example I and methacrylic acid by the method of Example I. The product was a viscous oil.

*Example III*

2 - (2,4 - dibromophenoxy)ethyl acrylate.—2-(2,4-dibromophenoxy)ethanol was prepared by the procedure of Example I. The crude product was then used for preparing the acrylate according to the procedure of Example I. The product was a viscous oil.

*Example IV*

2-(2,4-dibromophenoxy)ethyl methacrylate.—This ester was prepared by reacting the dibromophenoxyethanol of Example II with methacrylic acid by the method of Example I. The product was a viscous oil.

EXAMPLES OF COPOLYMER PREPARATION

*Example A*

The following materials were tumbled in a pressure bottle at 50° C. for 18 hours:

| | |
|---|---|
| Acrylonitrile _____ g__ | 14 |
| 2-(2,4,6-tribromophenoxy)ethyl acrylate _____ g__ | 6 |
| Water _____ ml__ | 100 |
| Lauryl sulfate _____ g__ | 0.8 |
| Ammonium persulfate _____ g__ | 0.2 |
| Sodium bisulfite _____ g__ | 0.1 |

The product was isolated by filtration as a white powder, washed with water and isopropyl alcohol, and dried at 60° C. It weighed 19.2 g. and was wet spun into fibers having the following properties:

2.42 g./den.
15% elongation
Sticking point 232–235° C.
Flow point 259° C. at 0.2 g./den.

The fibers were completely self-extinguishing.

*Example B*

The following materials were tumbled in a pressure bottle at 60° C. for 16 hours:

| | |
|---|---|
| Methyl acrylate _____ g__ | 13.5 |
| 2-(2,4,6,-tribromophenoxy)ethyl methacrylate __g__ | 6.5 |
| Tert-butyl alcohol _____ ml__ | 80 |
| Azobisisobutyronitrile _____ g__ | 0.2 |

The resulting copolymer was filtered, washed with more tert-butyl alcohol, and dried at 100° C. It weighed 19.1 g. and a bromine analysis showed that the polymer contained 31% of methacrylate. It was compression molded into buttons which had a heat distortion temperature of 129° C. at 66 p.s.i.

*Example C*

The following materials were placed in a 1 liter three-neck flask equipped with a sweep stirrer, a reflux condenser, and an inlet and outlet for nitrogen:

| | |
|---|---|
| Acrylonitrile _____ g__ | 50 |
| 2-(2,4,6-tribromophenoxy)ethyl methacrylate __g__ | 50 |
| Water _____ ml__ | 500 |
| Potassium persulfate _____ g__ | 1.0 |
| Sodium bisulfite _____ g__ | 0.5 |
| Sodium dodecylbenzene sulfonate _____ g__ | 4.0 |

After stirring under a blanket of nitrogen for 18 hours at 50° C., the polymer was isolated by filtration, washed with water and ethyl alcohol, and dried. It weighed 97.7 g. and contained 48% of the methacrylate. It was dry spun into fibers having the following properties:

3.2 g./den.
14% elongation
Sticking point 224–228° C.
Flow point 242° C. at 0.2 g./den.

The fibers were self-extinguishing.

*Example D*

A copolymer having the composition 65% methyl acrylate–35% 2-(2,6-dibromophenoxy)ethyl methacrylate was prepared. It was injection molded into bars having the following properties:

| | |
|---|---|
| Tensile strength _____ | 12,300 p.s.i. |
| Elongation _____ | 11% |
| Modulus _____ | $3.6 \times 10^5$ p.s.i. |
| Heat distortion _____ | 131° C. at 66 p.s.i. |

The copolymer was self-extinguishing.

*Example E*

A copolymer having the composition 60% vinyl chloride–40% 2-(p-bromophenoxy)ethyl acrylate was prepared. Clear, hard films were cast therefrom using dioxane as a solvent. These films were self-extinguishing.

*Example F*

A copolymer having the composition of 65% 2-(2,6-dibromophenoxy)ethyl acrylate–35% vinyl acetate was prepared. Clear, tough films of it were self-extingishing.

*Example G*

A copolymer having the composition 72% 2-(2,4,6-tribromophenoxy)ethyl methacrylate–28% 2-ethylhexyl methacrylate was prepared. The copolymer was self-extinguishing and was useful as a paper coating.

*Example H*

Using the method described in Example A, a copolymer was made having the composition 75% acrylonitrile–25% 2-(pentabromophenoxy)ethyl acrylate. Fibers spun from the the coplymer were self-extinguishing. They had a sticking point of 228–235° C. and a flow point of 256° C. at 0.2 g./den.

*Example I*

Seventy-five g. of acrylonitrile and 25 g. of 2-(2,3,4,6-tetrabromophenoxy)ethyl methacrylate were dissolved in 500 cc. of tert-butyl alcohol and 1.0 g. of acetyl peroxide was added. The solution was agitated at 50° for 24 hours. The copolymer separated out as fine particles. The yield was 90–92 g. Fibers containing 3% antimony trioxide were spun from the copolymer. They were self-extinguishing.

Antimony oxide can be added to any of the above copolymer compositions in order to improve their resistance to burning.

The invention has been described in detail with particular reference to preferred embodiments thereof, but, it will be understood that variations and modifications can be effected within the spirit and scope of the invention as described hereinabove and as defined in the appended claims.

We claim:

1. A product of the copolymerization of from about 60–90% by weight of acrylonitrile and from about 40–

10% by weight of a compound selected from the group represented by the formula

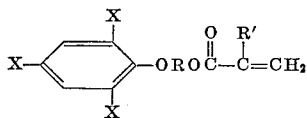

wherein R is selected from the group consisting of an ethylene and a propylene radical, R' is selected from the group consisting of a hydrogen atom and a methyl radical, and X represents a bromine atom.

2. Fibers prepared from the composition of claim 1.
3. Films prepared from the composition of claim 1.
4. A product of the copolymerization of from about 65–75% by weight of acrylonitrile and from about 35–25% by weight of a compound selected from the group represented by the formula

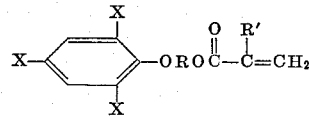

wherein R is selected from the group consisting of an ethylene and a propylene radical, R' is selected from the group consisting of a hydrogen atom and a methyl radical, and X represents a bromine atom.

References Cited by the Examiner
UNITED STATES PATENTS 3,076,838　2/1963　LaCombe _____ 260—47
3,131,166　4/1964　Harris _____ 260—47

WILLIAM H. SHORT, *Primary Examiner.*
J. C. MARTIN, *Assistant Examiner.*